United States Patent [19]
Morisawa

[11] Patent Number: 5,983,154
[45] Date of Patent: Nov. 9, 1999

[54] CONTROL SYSTEM FOR AUTOMATIC TRANSMISSION HAVING PLURAL RUNNING MODES

[75] Inventor: Kunio Morisawa, Toyota, Japan

[73] Assignee: Toyota Jidosha Kabushiki Kaisha, Toyota, Japan

[21] Appl. No.: 08/813,069

[22] Filed: Mar. 7, 1997

[30] Foreign Application Priority Data

Mar. 22, 1996 [JP] Japan ................................ 8-093068

[51] Int. Cl.⁶ .................. G01C 21/00; G08G 1/0968
[52] U.S. Cl. ............................. 701/56; 701/201
[58] Field of Search ............................ 701/55, 56, 65, 701/208, 213, 201, 210; 477/34, 97

[56] References Cited

U.S. PATENT DOCUMENTS

| | | | |
|---|---|---|---|
| 5,220,507 | 6/1993 | Kirson | 364/444 |
| 5,508,930 | 4/1996 | Smith, Jr. | 364/444 |
| 5,716,301 | 2/1998 | Wild et al. | 477/97 |
| 5,742,922 | 4/1998 | Kim | 701/201 |
| 5,774,073 | 6/1998 | Maekawa et al. | 340/995 |
| 5,832,400 | 11/1998 | Takahashi et al. | 701/53 |

FOREIGN PATENT DOCUMENTS

| | | |
|---|---|---|
| 43 37 163 | 5/1994 | Germany . |
| 195 28 625 | 2/1997 | Germany . |
| 5-322591 | 12/1993 | Japan . |
| 6-58141 | 8/1994 | Japan . |
| 6-272753 | 9/1994 | Japan . |
| 7-85392 | 3/1995 | Japan . |
| 7-192194 | 7/1995 | Japan . |
| 8-72591 | 3/1996 | Japan . |

OTHER PUBLICATIONS

Patent Abstracts of Japan, vol. 18, No. 135 (P–1705), Mar. 7, 1994, JP 5–322591, Dec. 7, 1993.
Patent Abstracts of Japan, vol. 95, No. 10, Nov. 30, 1995, JP 7–192194, Jul. 28, 1995.
Patent Abstracts of Japan, vol. 12, No. 182 (M–702), May 27, 1988, JP 62–292947, Dec. 19, 1987.
A. Bastian, et al., Proceedings of the International Conference on Fuzzy Systems, International Joint Conference of the 4$^{th}$ International IEEE Conference on Fuzzy Systems and the 2$^{nd}$ International Fuzzy Engineering Symposium, vol. 2, pp. 1063 to 1070, "System Overview and Special Features of Fate: Fuzzy Logic Automatic Transmission Expert System", Mar. 20, 1995.
Andreas Bastian, Vehicle System Dynamics, vol. 24, Nos. 4/5, pp. 389 to 400, "Fuzzy Logic in Automatic Transmission Control", Jun. 1, 1995.

*Primary Examiner*—Michael J. Zanelli
*Attorney, Agent, or Firm*—Oblon, Spivak, McClelland, Maier & Neustadt, P.C.

[57] ABSTRACT

A control system for executing a control of the output torque of an automatic transmission on the basis of any of a plurality of running modes. This control system is given a route selecting function to select a route to be followed by the vehicle, with reference to the running characteristics of the running mode.

10 Claims, 7 Drawing Sheets

CONTROL SYSTEM FOR AUTOMATIC TRANSMISSION HAVING PLURAL RUNNING MODES

BACKGROUND OF THE INVENTION

1. Field of the Invention

The present invention relates to a control system capable of changing the running modes to be used for controlling the output torque of an automatic transmission, in accordance with the road situations of a route to be followed by the vehicle.

2. Related Art

As well known in the art, a stage type automatic transmission is provided with a gear transmission mechanism, frictional engagement units for changing the torque transmission routes of the gear transmission mechanism, and a lockup clutch. In order to control the running performance of the vehicle in accordance with the road situations under which the vehicle is to run, the automatic transmission of this type is preset with a plurality of kinds of running modes including a normal mode, an economy mode, a snow mode, a sport mode and a power mode, which can be changed by the operation of the driver.

On the basis of the running states, as detected during the run of the vehicle, such as the data including the vehicle speed and the throttle opening and the individual running modes (or shift diagrams), moreover, the frictional engagement unit and the lockup clutch are applied/released to control the output torque of the automatic transmission.

However, the running performance of the vehicle depends upon the conditions such as the hill climbing resistance of the road or the frictional resistance of the road to the wheels, and these conditions change moment by moment according to the situations of the road. Merely by changing the running mode by the manual operation of the driver, therefore, an output torque matching the road situations may be achieved to lower the running performance and the drivability.

In recent years, however, the navigation system has been mounted on the ordinary vehicle. This navigation system is constructed to hold maps as electronic data in a recording medium such as CD-ROM and to locate the position of the vehicle by the GPS (Global Positioning System) or the self-contained navigation (or dead reckoning navigation) utilizing artificial satellites so that the present position or moving locus of the vehicle or the route to be followed may be visually outputted to a display unit such as a CRT by combining those data, or so that the running direction may be guided by voices.

The electronic map to be employed in this navigation system can be stored with not only information such as the arrangement of roads, public facilities or rivers but also slopes of roads or legal regulations for road traffic. A variety of information such as the coefficients of friction of road surfaces, as obtained by the actual runs, can be additionally stored. As a result, the information, as obtained by the navigation system, not only guides the vehicle to the destination but also can be used for controlling the engine, the transmission, the brake and the suspension when the vehicle is to run on the route to be followed.

One example of an invention, in which the information obtained by the navigation system is thus applied for controlling the automatic transmission of the vehicle, is disclosed in JP-B-6-58141. The control system for an automatic transmission, as disclosed in the gazette, comprises: memory means (ROM) stored with shift patterns (or shift diagrams) for an economy run or a high output run; running state detecting means for detecting the running state of the vehicle; and control means for controlling the speed change of the automatic transmission on the basis of the shift patterns and the running states. Further comprised are: a navigation system for storing road information for guiding the running of the vehicle; present position detecting means for detecting the present position of the vehicle; and change means for changing the shift pattern to another in accordance with the road information concerning the environment of the present position.

According to the control system for the automatic transmission, this automatic transmission is controlled according to the shift pattern in the selected running mode. When the information of a curve of the road or an unpaved road is detected, the shift pattern is changed to another in accordance with the detected information so that the control of the automatic transmission is executed by the changed shift pattern. As a result, there are achieved the advantage that the shift is inhibited at the time of running on the curve or that the shift is inhibited at the time of running on a low surface friction road such as the unpaved road.

However, the control system for the automatic transmission, as disclosed in the aforementioned gazette, detects the road situations during the run of the vehicle and changes the shift pattern on the basis of the detected road situations. As a result, the running characteristics of the vehicle on the route to be followed to the destination are disadvantageously different from those, as intrinsically intended by the driver, that is, which of the mileage or the driving force is to be stressed. Moreover, the absence of the running mode of the running characteristics matching the situations of the route to be followed may lower the running performance or the drivability at the actual run.

SUMMARY OF THE INVENTION

A main object of the present invention is to improve the drivability by matching the route to be followed by a vehicle and the running mode.

Another object of the present invention is to provide a control system for an automatic transmission, which allows the driver in advance to confirm the matching between the situations of the route to be followed to a destination and the running characteristics of the running mode.

In the control system of the present invention, therefore, by setting the running mode to be used for a run to the destination, the route to be followed is selected to match the running mode. Moreover, when the selected route to be followed is approved by the driver, the control is executed on the basis of the running mode.

As a result, while the vehicle is running on the followed route, the running characteristics, as obtained, are those intended by the driver, and the output torque of the automatic transmission matches the situations of the followed route so that the running performance and the drivability of the vehicle are improved.

In the control system of the present invention, moreover, the running mode matching the route to be followed to the destination is set by selecting the followed route so that the automatic transmission is controlled by the set running mode when this running mode is approved by the driver.

In the control system of the present invention, furthermore, by selecting the destination, the route to be followed to the destination and the running mode matching the route are selected. When either the route to be followed or the running mode is approved by the driver, the automatic transmission is controlled on the basis of the approved running mode.

According to the present invention, therefore, the route to be followed and the running mode for controlling the automatic transmission can be set as a matching combination so that the run can conform to the intention of the driver to improve the drivability.

In the present invention, furthermore, the running state of the vehicle is detected during the run so that the running mode can be changed on the basis of the detected running mode. As a result, the actual running situations can be reflected on the running mode to improve the drivability better.

The above and further objects and novel features of the present invention will more fully appear from the following detailed description when the same is read with reference to the accompanying drawings. It is to be expressly understood, however, that the drawings are for the purpose of illustration only and are not intended as a definition of the limits of the invention.

DETAILED DESCRIPTION OF THE PREFERRED EMBODIMENTS

Figure 1:
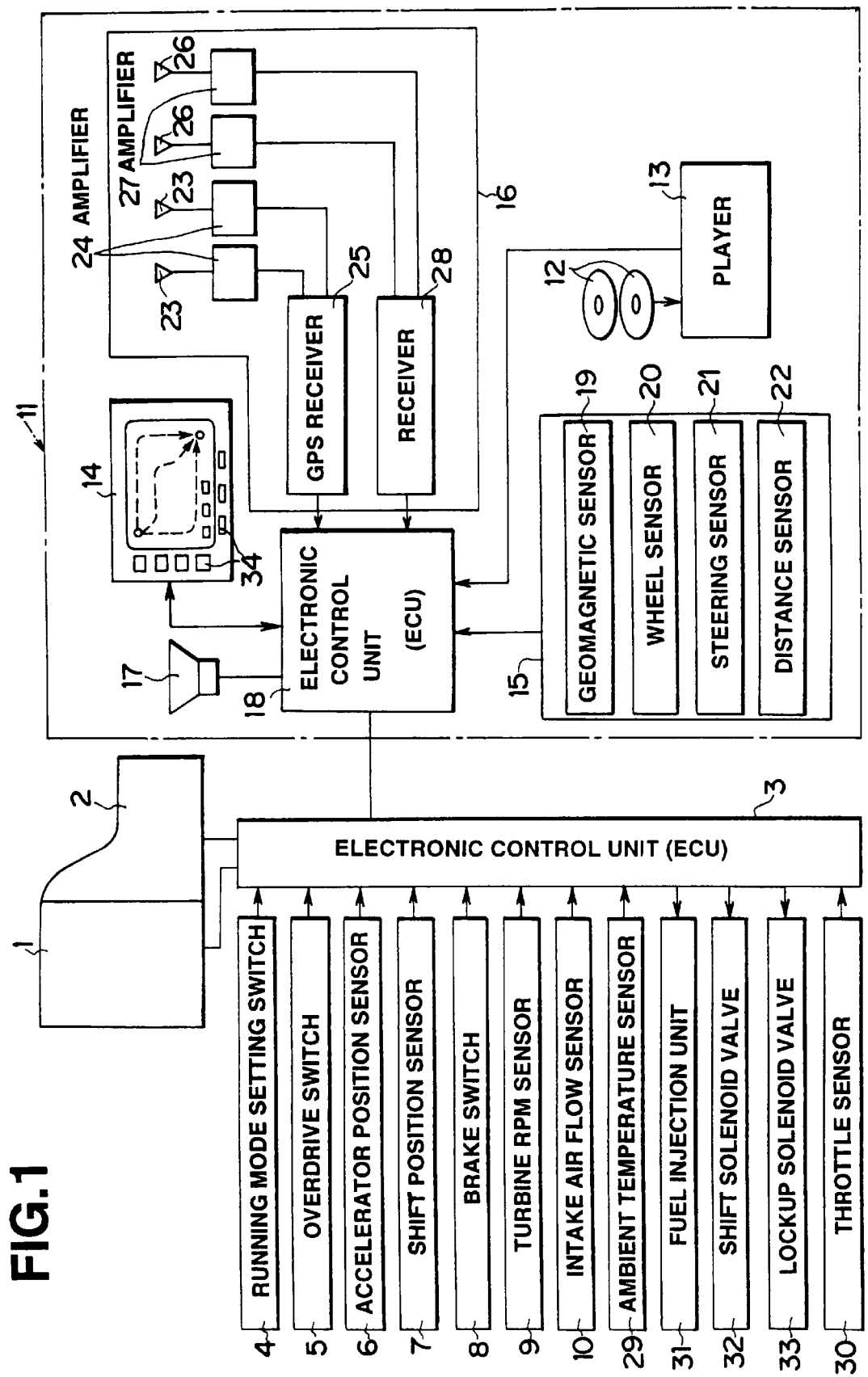
FIG. 1 is a block diagram showing a control system for a vehicle, to which is applied the present invention.

Here will be described in more detail the present invention with reference to the accompanying drawings. FIG. 1 is a block diagram showing a control system for a vehicle, to which is applied the present invention. An engine 1, as used here, has the well-known structure including a combustion chamber, a piston, a crankshaft and an intake/exhaust system. An automatic transmission 2 for converting the torque, as outputted from the crankshaft of the engine 1, is exemplified by the gear stage type including: a torque converter, a lockup clutch, a planetary gear mechanism, a frictional engagement unit having brakes and clutches; and a hydraulic control unit for controlling the lockup clutch and the frictional engagement unit.

Moreover, as not shown in Figures specifically, the engine 1 is equipped with an electronic throttle valve, an ignition timing control unit, an engine RPM sensor and an intake air temperature sensor. An electronic control unit (ECU) 3, as connected with the engine 1 and the automatic transmission 2, is a microcomputer which is composed mainly of a central processing unit (MPU or CPU), a memory (RAM and ROM) and an input/output interface.

To the electronic control unit 3, there are inputted signals from a running mode setting switch 4 to be operated by a driver, an overdrive switch 5 to be operated by the driver, an accelerator position sensor 6 for detecting the depression of the accelerator pedal, a shift position sensor 7 for detecting the shift position of the automatic transmission 2, and a brake switch 8 for detecting the depression of the brake pedal.

To the electronic control unit 3, there are further inputted signals from a turbine RPM sensor 9 for detecting the turbine RPM of the automatic transmission 2, an intake air flow sensor 10 for detecting the intake air flow of the intake pipe of the engine 1, an ambient temperature sensor 29 for detecting the ambient temperature around the vehicle, a throttle sensor 30 for detecting the throttle opening of the engine 1, a (not-shown) output shaft RPM sensor of the automatic transmission 2, and a (not-shown) engine RPM sensor.

Moreover, the electronic control unit 3 is given functions to adjust the output by changing the degree of opening of the electronic throttle valve in accordance with the depression of the accelerator pedal and to change the control characteristics of the opening of the electronic throttle valve in accordance with the depression of the accelerator pedal, on the basis of the running state of the vehicle or the driving tendency of the driver.

In order to improve the mileage or fuel economy, the electronic control unit 3 performs a control to stop the injection of fuel if the engine RPM at a coasting time exceeds a reference value. In order to dump the shifting shock of the automatic transmission 2, the electronic control unit 3 is given another function to lower the engine output temporarily by executing an angular retarding control of the ignition timing at a shifting time of the automatic transmission 2.

On the other hand, the electronic control unit 3 is stored with a shift pattern which is composed mainly of a shift diagram, to decide a gear stage on the basis of the input data including the throttle opening, the vehicle speed, the shift position and the driving tendency, and the shift pattern. On the other hand, the hydraulic control unit of the automatic transmission 2 is constructed to include: a shift solenoid valve 32 for executing the speed changes of the automatic transmission 2; a lockup solenoid valve 33 for executing the application/release of the lockup clutch; and a plurality of solenoid valves (although not shown) for outputting signal pressures to those valves. Moreover, these solenoid valves are controlled by the electric signals, as inputted from the electronic control unit 3. This electronic control unit 3 is constructed to further control the lockup clutch in accordance with the running state, as decided from the input data, and the line pressure of the hydraulic control unit in accordance with the throttle opening.

On the other hand, the running to be applied for controlling the automatic transmission 2 can be selected from any of a normal mode, an economy mode, a power mode and a snow mode by operating the aforementioned running mode setting switch 4. For this, the electronic control unit 3 is stored in advance with a plurality of kinds of shift patterns corresponding to the various running modes. The individual shift patterns are different in the regions for the shift points and the gear stages so that they have different mutually mileage characteristics, driving force characteristics, shifting frequency characteristics, lockup clutch ON/OFF characteristics and torque converter characteristics.

For example: the normal mode is employed when the vehicle runs on ordinary flat roads; the power mode is employed when the vehicle runs on mountainous areas, unpaved roads or rough roads, as demanding a high driving force; the economy mode is employed when the vehicle runs on urban areas or motorways stressing the mileage; and the snow mode is employed when the vehicle runs on roads having small coefficients of surface friction such as snow-laden roads or frozen roads.

The shift diagram for the power mode is prepared such that the shift line is shifted to a higher speed side than that in the shift diagram for the normal mode so that the lower gear stage may be easily used by extending the lower gear region to a higher speed side. In the power mode, therefore, the accelerability is better improved, and the engine brake is more effective.

On the contrary, the shift diagram for the economy mode is prepared such that the shift line is shifted to a lower speed side than that for the normal mode. As a result, the higher gear region is extended to a lower speed side so that the vehicle runs at a smaller engine RPM to improve the mileage.

In the shift diagram for the snow mode, the gear stages are so set that the lowest gear stage may take a gear ratio smaller such as a second speed than the highest one. As a result, the driving force for starting the vehicle can be reduced to effect the smooth vehicle start on the so-called "low surface friction roads".

Moreover, the electronic control unit 3 is given a function to judge the driving tendency of the driver from a neural network thereby to select the shift pattern automatically. Specifically, the electronic control unit 3 judges whether or not the vehicle is performing the so-called "sporty drive" stressing the accelerability or the drive directed to an improvement in the mileage, by fetching the data of the depression of the accelerator pedal (or throttle opening), the engine RPM, the vehicle speed, the gear stage, the deceleration by the braking operation and the steering angle.

In order to improve the stability, driving performance and power performance of the vehicle by feeding the aforementioned electronic control unit 3 with information and instruction signals, moreover, there is provided the following system, as specified by a navigation system 11. This navigation system 11 is a unit having a fundamental function to guide an automobile to a desired destination and has the following construction and additional functions.

The navigation system 11 is equipped with: a reading player 13 having a changer for suitably exchanging information recording media 12, as loaded with an optical disk or a magnetic disk, and a multi-display 14 having a liquid crystal display or a CRT for displaying the information, as read out from the player 13, the selected running mode and the route to be followed.

This multi-display 14 is arranged on the instrumental panel sideways of the globe box and is equipped with a variety of operation buttons 34 for starting/stopping the navigation system 11, for enlarging/reducing the display screen, for setting a destination and a route to be followed to the destination, for setting a running mode to be used for the simulation, for setting a season, and for retrieving the matching relations between the route to be followed and the running mode. In order to display the information, as read out from the player 13, the running mode and the route to be followed, an image projecting portion may be provided in such a portion on the windshield of the vehicle as will not obstruct the field of view.

The navigation system 11 is further equipped with: a first position detecting unit 15 and a second position detecting unit 16 for detecting the present position of the vehicle and the road situations; and a speaker 17 for informing the driver aurally of the road situations and the matching relations between the route to be followed to the destination and the running mode. Moreover, the player 13, multi-display 14, first position detecting unit 15, second position detecting unit 16 and speaker 17 are controlled by an electronic control unit 18. This electronic control unit 18 is constructed of a microcomputer which is composed mainly of a central processing unit (MPU or CPU), a memory unit (RAM and ROM) and an input/output interface.

The aforementioned information recording media 12 are stored with not only the information necessary for the vehicle to run, such as maps, place names, roads and major buildings around the roads but also the specific road situations such as straight courses, curves, uphills, downhills, gravel roads, sandy beaches, riverbeds, urban areas, mountainous regions, ordinary roads, motorways, rivers, seas, unpaved roads, rough roads, road signs and traffic regulations.

The above-specified road information is stored in the digitized form in the information recording media 12. Specifically, a road map is segmented in a mesh shape, each of which is composed of nodes and links joining the nodes. The information recording media 12 are stored with the attributes of the links joining the nodes, that is, latitudes and longitudes of roads, road numbers, widths of roads, distances of straight courses, slopes of roads and radii of curves.

On the other hand, the first position detecting unit 15 detects the present position of the vehicle and the road situations by the dead reckoning navigation and includes a geomagnetic sensor 19 for detecting the azimuth for the vehicle to run, a wheel sensor 20 for detecting the vehicle speed, a steering sensor 21 for detecting the steering angle, and a distance sensor 22 for detecting the distance to the foregoing vehicle.

Moreover, the second position detecting unit 16 detects the present position of the vehicle and the road situations by the radio navigation and includes a GPS antenna 23 for receiving radio waves an artificial satellite, an amplifier 24 connected with the GPS antenna 23, and a GPS receiver 25 connected with the amplifier 24.

The second position detecting unit 16 further includes an antenna 26 for receiving radio waves from beacons or sign posts, as erected at road sides or intersections, or the VICS (Vehicle Information & Communication System) or the SSVS (Super Smart Vehicle System), am amplifier 27 connected with the antenna 26, and a receiver 28 connected with the amplifier 27.

In the navigation system 11 thus constructed, the data of the information of a route to be followed, as detected by the first information detecting unit 15, the data of the information of a route to be followed, as detected by the second information detecting unit 16, and the map data, as stored in the information recording media 12, are synthetically compared or evaluated to decide the present position on the route being followed by the vehicle and the surrounding road situations.

For example, the following items: whether the road is flat or rough; the hill climbing resistance to uphills; whether mountainous regions or not; changes in uphills and downhills; whether the roads are straight courses or curves; running resistances upon cornering curves or rough roads; starting/stopping frequencies, as probably estimated from maps; seasons; weathers; ambient temperatures; whether or not the traffic is jammed; whether motorways or ordinary roads; whether the or not road is paved; and the limited vehicle speed on the road being followed are detected, and the detected information is inputted to the electronic control unit 3.

Here, when the present position of the vehicle is to be decided on the basis of the data, as detected by the first information detecting unit 15, a detection errors may occur in the individual sensors. Thus, there is conducted a control for absorbing the errors by the map matching. This map matching implies a function to correct the present position of the vehicle by comparing the running locus of the vehicle, as detected from the signals of the various sensors of the first information detecting unit 15, with the map data, as stored in the information recording media 12, and the data, as detected by the second information detecting unit 16.

In the control system for an automatic transmission, as having the hardware construction thus far described, when the running mode setting switch 4 is operated by the driver and when the vehicle is started to run, the speed change of the automatic transmission 2 and the application/release of the lockup clutch are controlled on the basis of the set running mode (or shift diagram) and the running state of the vehicle such as the vehicle speed and the throttle opening.

While the vehicle is running, on the other hand, the driver can change the running mode by operating the running mode setting switch 4 manually according to the running situations, and the running mode can be automatically changed to the optimum running mode on the basis of the running state of the vehicle and the road situations, as detected by the navigation system 11.

Here, the running state of the vehicle can be exemplified by not only the vehicle speed and the throttle opening but also the driving tendency of the driver, as decided by the neural network. This driving tendency of the driver is judged on the basis of the depression of the accelerator pedal, the steering angle, the depressing frequency of the brake pedal and the acceleration/deceleration, for example, and is decided, evaluated and stored by the electronic control unit 3.

Thus, when the running pattern, as set, is to be automatically changed to another on the basis of the situations of the road being followed by the vehicle and the running state of the vehicle, the electronic control unit 3 compares the running mode, as set at present, namely, the running characteristics, as determined on the basis of the shift diagram, and the road situations, to decide whether or not the shift diagram and the road situations match each other. On the basis of this decision, moreover, the shift diagram is maintained or changed.

The method of changing the shift diagram can be exemplified by reading the shift diagram being used into another shift diagram or by correcting the shift diagram being used, by processing it. For this change, the electronic control unit 3 is stored in advance with data for providing a reference for changing the shift diagram, such as the shifting frequency, the throttle opening, the accelerator depressing speed, the start/stop interval of the vehicle, the steering angle and the brake pedal depressing frequency.

Specific examples of the controls of the control system for an automatic transmission, as constructed hereinbefore, will be described with reference to flow charts, as shown in FIGS. 2 to 7.

Figure 2:
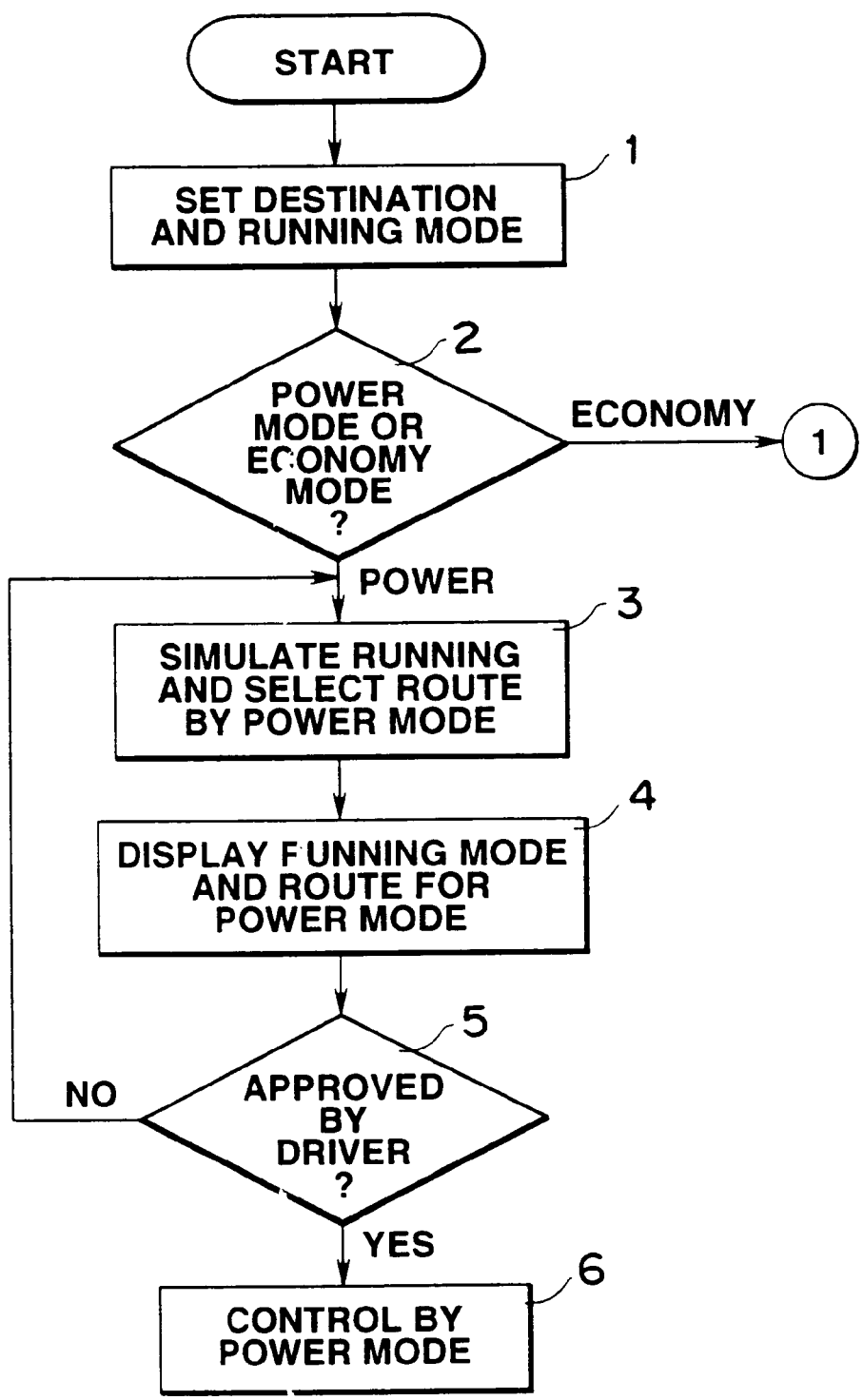
FIG. 2 is a flow chart showing an example of the control to be executed by a control system for an automatic transmission in accordance with the present invention.
Figure 3:
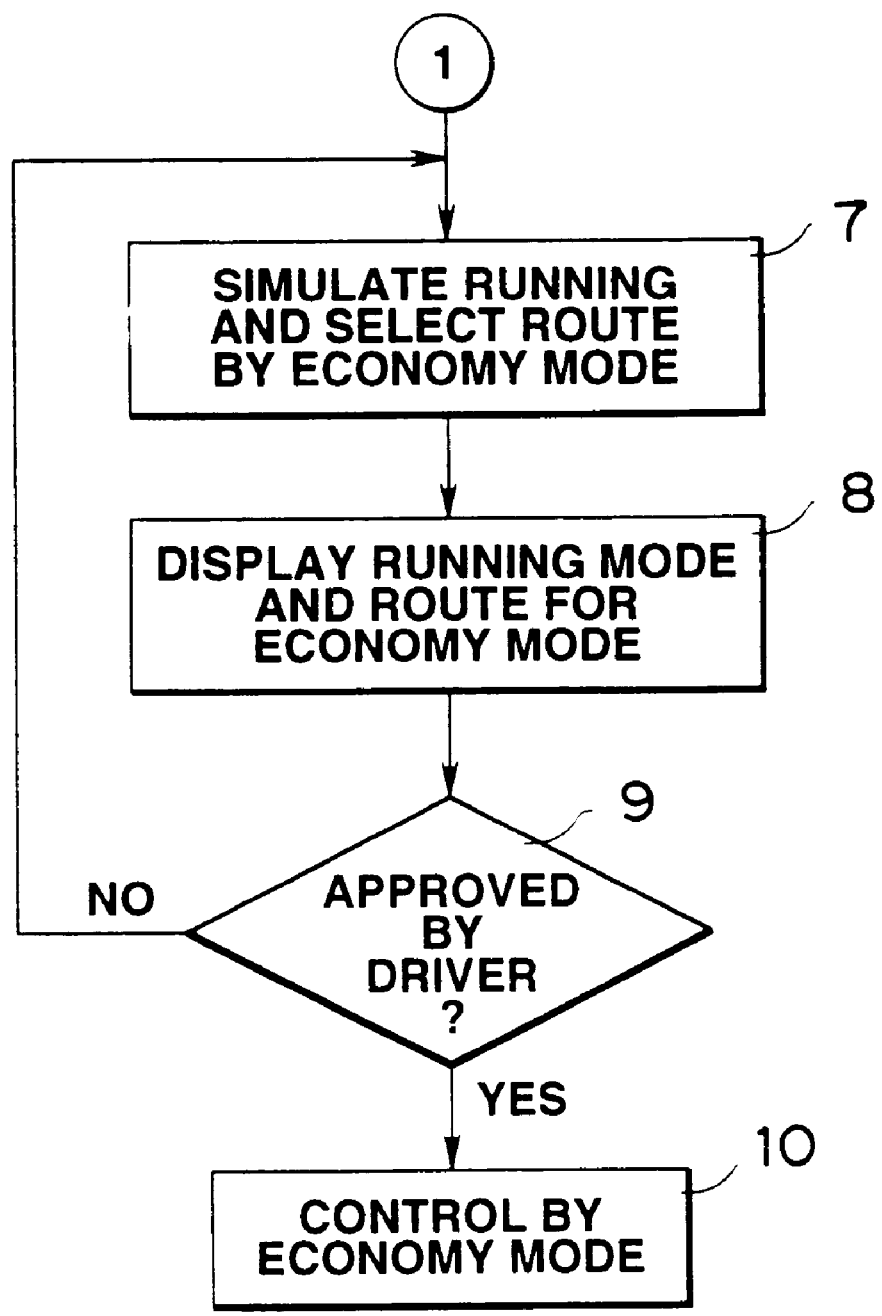
FIG. 3 is a flow chart showing the example of the control to be executed by the control system for an automatic transmission in accordance with the present invention.

FIGS. 2 and 3 are flow charts showing a first control example of the present invention. First of all, when the navigation system 11 is operated prior to the run of the vehicle to set a destination and a running mode (or running modes) (at Step 1), as shown in FIG. 2, a plurality of routes to be followed from the present place to the destination and the running mode (or modes) are displayed in the multi-display 14. Moreover, it is decided by the electronic control unit 3 what running characteristics are owned by the running mode, as set. In this embodiment, specifically, it is decided (at Step 2) whether the running mode is the power mode stressing the driving force or the economy mode stressing the mileage.

If the setting of the power mode is decided at Step 2, the electronic control unit 3 executes the running simulations of a plurality of routes to be followed for the power mode, and selects the route to be followed, as matching the running characteristics for the power mode (at Step 3). Then, the route to be followed, as containing mountainous regions, unpaved roads and rough roads matching the power mode is displayed by or outputted to at least one of the multi-display 14 and the speaker 17 (at Step 4).

If the route to be followed is displayed, the driver operates the operation buttons 34 to approve or disapprove the route to be followed, as displayed. Then, it is decided (at Step 5) by the electronic control unit 3 whether or not the route to be followed, as displayed, has been approved by the driver. If the answer of Step 5 is "YES", the output torque of the automatic transmission 2 is controlled (at Step 6) by the power mode when the vehicle actually runs on the selected route.

If the answer of Step 5 is "NO", the routine is returned to Step 3, at which the running of another route to be followed is simulated. The aforementioned Step 3 corresponds to route selecting means of the present invention; the Step 5 corresponds to first decision means in the present invention for deciding approval of the route to be followed; and the Step 6 corresponds to first control means for controlling the approved route to be followed, by the running mode.

On the other hand, if it is decided at the aforementioned Step 2 that the economy mode has been set, the control is executed on the basis of the flow chart of FIG. 3. Specifically, the electronic control unit 3 executes the running simulation on a plurality of routes to be followed to the destination and decides the matching between the running characteristics of the economy mode and the routes to be followed (at Step 7) on the basis of the economy mode. The route to be followed, as matching the economy mode and containing urban areas and motorways, is displayed in or outputted to at least one of the multi-display 14 and the speaker 17 (at Step 8).

When the route to be followed is displayed, the driver operates the operation buttons 34 to approve or disapprove the route to be followed, as displayed. Then, it is decided (at Step 9) by the electronic control unit 3 whether or not the route to be followed, as displayed, is approved by the driver. If the answer of Step 9 is "YES", the output torque of the automatic transmission 2 is controlled (at Step 10) by the economy mode when the vehicle actually runs on the selected route.

If the answer of Step 9 is "NO", on the other hand, the routine is returned to Step 7. The aforementioned Step 8 corresponds to the route selecting means in the present invention; the Step 9 corresponds to the first decision means in the present invention for deciding approval of the route to be followed; and the Step 10 corresponds to the first control means for executing control of the route to be followed, as approved, by the running mode. Incidentally, a similar control is executed if the normal mode or the snow mode is selected at the aforementioned Step 1. If the normal mode is set, for example, the route to be followed, as selected, contains straight courses and flat roads.

Thus, according to the control example of FIGS. 2 and 3, if the running mode is set prior to the run of the vehicle, the route to be followed, as matching the set running mode, is selected and displayed. For example: if the normal mode is set, the route to be followed, as containing urban areas and flat roads, is selected; if the power mode is set, the route to be followed, as containing mountainous regions, uphills and downhills and rough roads demanding a high driving force and a high engine braking force, is selected; and if the economy mode is set, the route to be followed, as containing motorways and urban areas, is selected.

As a result, the route to be followed, as matching the running characteristics intended by the driver, can be confirmed before the start of the vehicle, and the running characteristics, as intended by the driver, can be achieved while the vehicle is actually running on the followed route to the destination. Moreover, the output torque of the automatic transmission matches the situations of the followed route so that the running performance and the drivability of the vehicle are improved.

According to the control example of FIGS. 2 and 3, on the other hand, if the route to be followed, as selected, is approved by the driver, the automatic transmission 2 is controlled by the matching running mode when the vehicle runs on the followed route, as approved, the intention of the driver is liable to be reflected on the output torque of the automatic transmission 2 thereby to improve the running performance and the drivability better.

Figure 4:
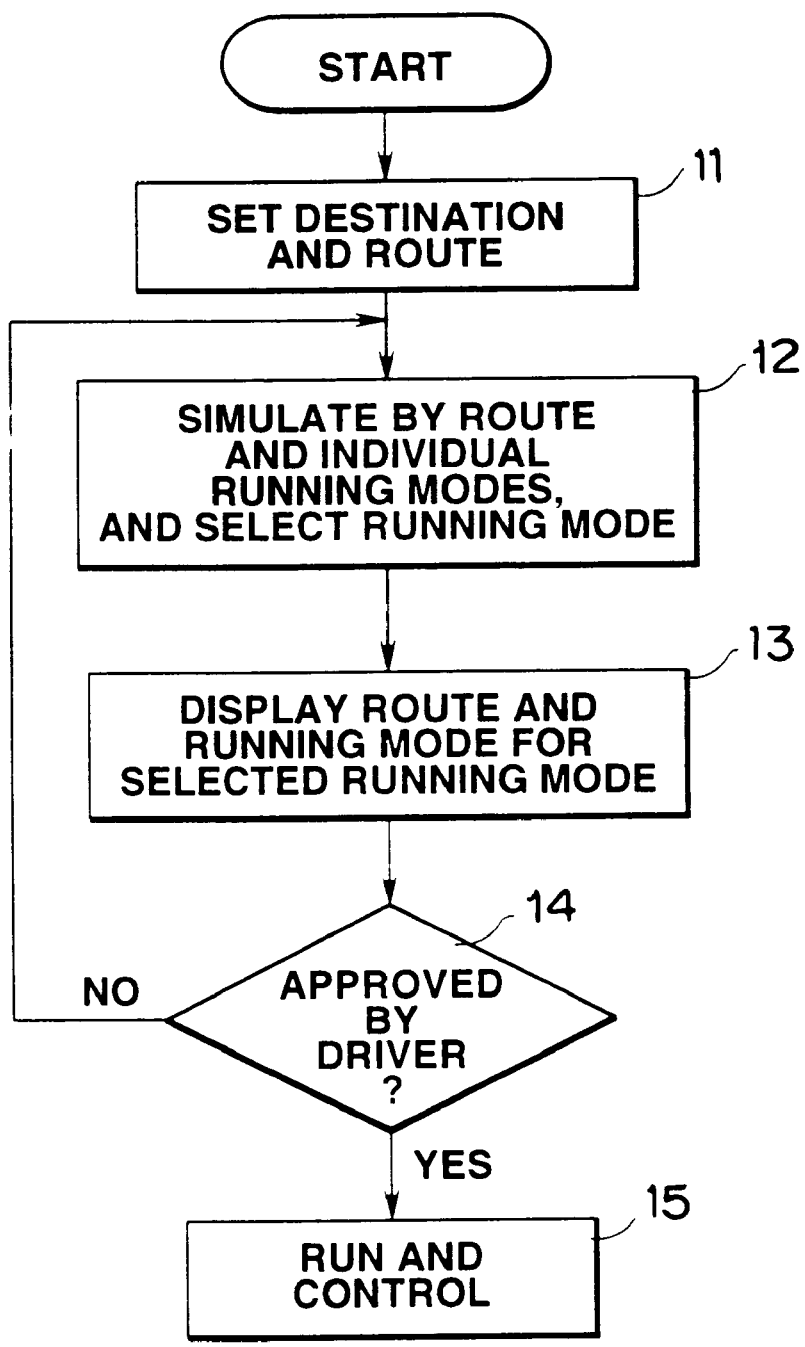
FIG. 4 is a flow chart showing another example of the control to be executed by the control system for an automatic transmission in accordance with the present invention.

FIG. 4 is a flow chart showing a second control example of the present invention. First of all, the driver operates the navigation system 11 to set a destination and a route (or routes) to be followed to the destination (at Step 11), and to display it (or them) on the multi-display 14. Then, the electronic control unit 3 executes simulations by the individual running modes corresponding to the road situations of the route to be followed, as set, and selects the running mode matching the route to be followed (at Step 12). Then, the running mode, as matching the situations of the route to be followed is displayed by or outputted to at least one of the multi-display 14 and the speaker 17 (at Step 13).

The route to be followed and the running mode are, if displayed, approved or disapproved by the driver so that it is decided (at Step 14) by the electronic control unit 3 whether or not the route to be followed, as displayed, has been approved by the driver. If the answer of Step 14 is "YES", the control of the automatic transmission 2 when the vehicle actually runs on the followed route, on the basis of the running mode selected (at Step 15). If the answer of Step 14 is "NO", the routine returns to Step 12. The aforementioned Step 12 corresponds to running mode selecting means of the present invention; the Step 14 corresponds to second decision means for approving the route to be followed and the running mode in the present invention; and the Step 15 corresponds to second control means for performing the control on the basis of the running mode.

Thus, according to the control example of FIG. 4, if the destination and the route to be followed are set prior to the run of the vehicle, the running mode having the running characteristics matching the situations of the route to be followed, as set, is selected and displayed. For example: the normal mode is selected for the route to be followed, as containing urban areas and flat roads; the power mode is selected for the route to be followed, as containing mountainous regions, uphills and downhills and rough roads demanding a high driving force and a high engine braking force; the economy mode is selected for the route to be followed, as containing motorways and urban areas; and the snow mode is selected for the route to be followed, as containing snow-laden roads and frozen roads.

Therefore, the driver can confirm the matching of the route to be followed and the runnning characteristics of the running mode so that it is possible to achieve the running characteristics intended by the driver, while the vehicle is actually runnnig on the followed route to the destination. Furthermore, driving force, engine braking force, acceleration and so on of the vehicle match to the situation of the route to be followed so that the running performance and the drivability are improved.

According to the control example of FIG. 4, on the other hand, if the running mode, as selected, is approved by the driver, the automatic transmission 2 is controlled by the approved running mode when the vehicle runs on the followed route, the intention of the driver is liable to be reflected on the output torque of the automatic transmission 2 thereby to improve the running performance and the drivability better.

Figure 5:
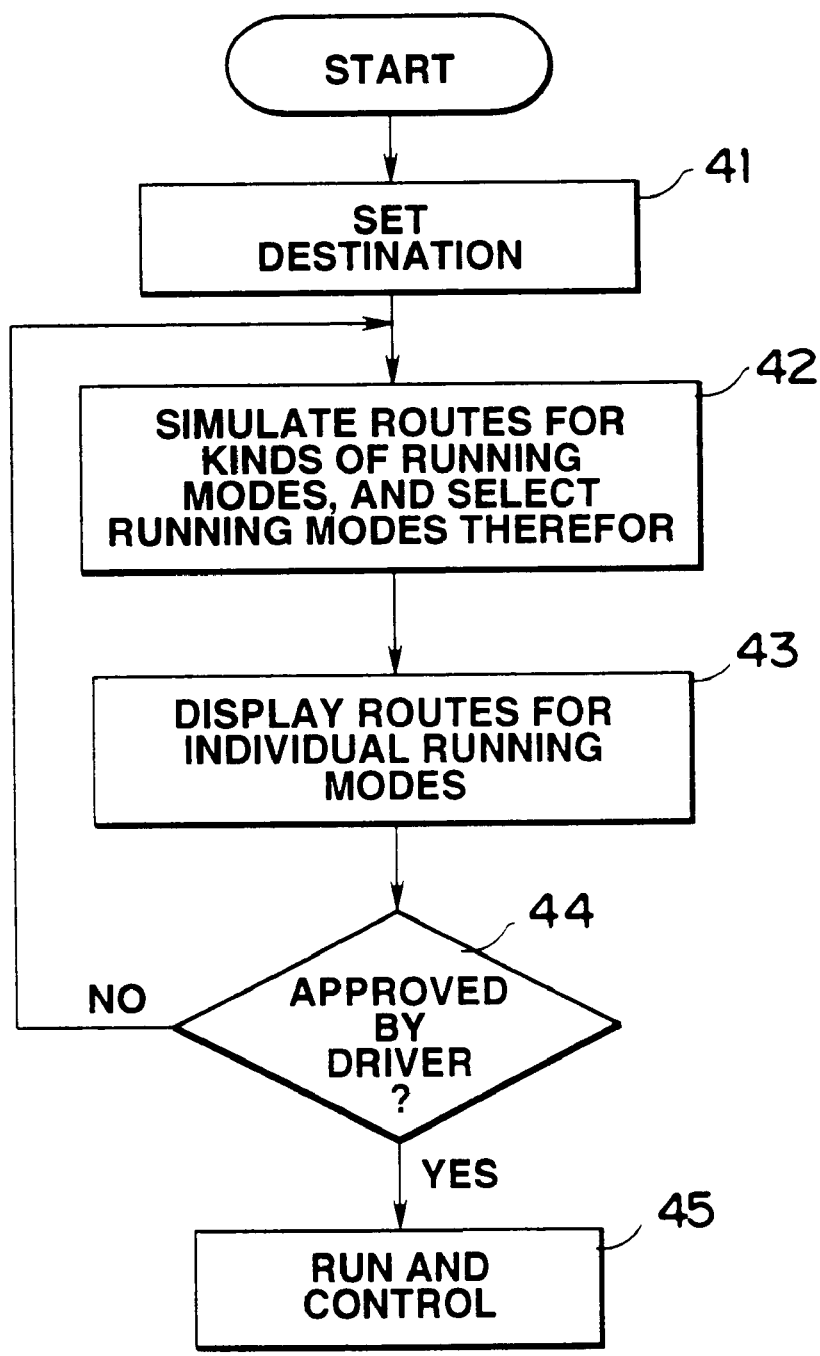
FIG. 5 is a flow chart showing another example of the control to be executed by the control system for an automatic transmission in accordance with the present invention.

FIG. 5 is a flow chart showing a third control example of the present invention. First of all, the navigation system 11 is operated by the driver to set a destination (at Step 41). By the electronic control unit 3 and the electronic control unit 18, for a plurality of running modes, the running simulations of individual routes to be followed to the destination are performed, and the routes to be followed, as matching the individual running modes are selected (at Step 42). Next, the individual running modes and the routes to be followed, as matching the running modes, are displayed by the navigation system 11 (at Step 43).

After this, the driver approves or disapproves the combinations, as displayed, of the running modes and the routes to be followed, and it is decided (at Step 44) whether or not the combinations are approved by the driver. If the answer of Step 44 is "YES", the control by the selected running mode is executed (at Step 45) when the vehicle runs on the followed route. If the answer of Step 44 is "NO", the routine returns to Step 42.

The aforementioned Step 41 corresponds destination setting means in the present invention, and the Step 42 corresponds to the route selecting means of the present invention. Thus, according to the control example of FIG. 5, the effects similar to those of the control examples of FIGS. 2 and 3 and FIG. 4 are obtained, and the running modes, as referring to a plurality of routes to be followed, and the routes to be followed, as referring to the running characteristics of the running modes, are selected and displayed.

As a result, even when the driver is poor in the previous knowledge on the route to be followed and fails to take no especial consideration into the running characteristics of the route to be followed, he is enabled to set the followed route and the running mode, as intended, promptly and easily merely by setting the destination so that the running performance can be further improved for the drive of the vehicle.

Figure 6:
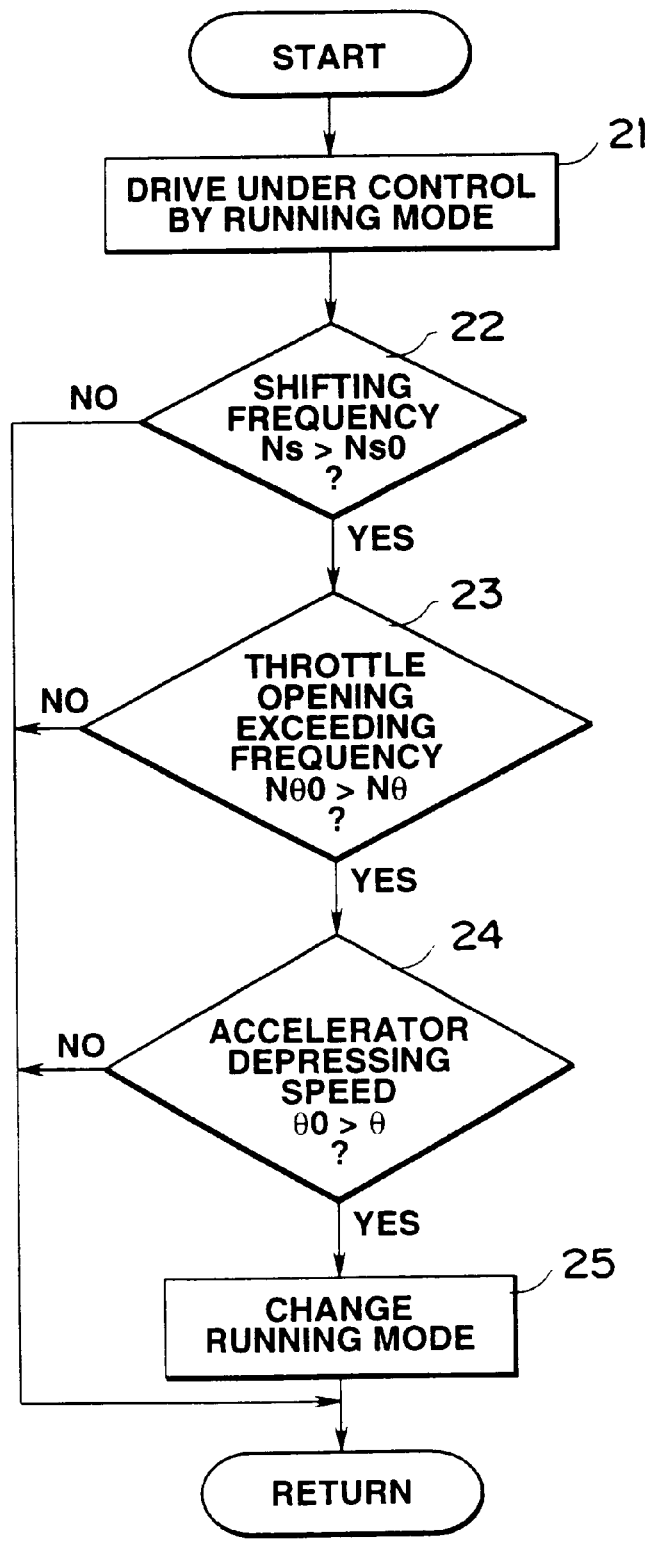
FIG. 6 is a flow chart showing another example of the control to be executed by the control system for an automatic transmission in accordance with the present invention.

FIG. 6 is a flow chart showing a fourth control example of the present invention, that is, a control content after the run of the vehicle has been started by the controls of FIGS. 2 to 5. First of all, the vehicle is driven (at Step 21) while controlling the automatic transmission 2 on the basis of the selected running mode. By the electronic control unit 3, on the other hand, it is decided (at Step 22) whether or not the running state of the vehicle, that is, the shifting frequency Ns of the automatic transmission 2 within a predetermined time period or within a predetermined running distance in this control example exceeds a reference shifting frequency Ns0.

If the answer of Step 22 is "YES", a frequency Nθ0, in which the throttle opening exceeds a reference value, is detected by the electronic control unit 3, and it is decided (at Step 23) whether or not the frequency Nθ0 exceeds a reference frequency Nθ. If the answer of Step 23 is "YES", it is decided (at Step 24) whether or not an accelerator depressing speed θ0 exceeds a reference value θ. By the answers of the aforementioned Steps 22 to 24, it is possible to detect whether or not the vehicle repeats uphill/downhill so that it is running in the road situations demanding a high driving force, such as in mountainous regions.

If the answer of Step 24 is "YES", the running mode (or shift diagram) being employed is changed by the electronic control unit 3 to another, i.e., a running mode to be shifted thereto at a higher vehicle speed and with a lower throttle opening (at Step 25), and the routine is returned. If the answer of any of Steps 22 to 24 is "NO", the routine is returned. These Steps 22 to 24 correspond to running state detecting means of the present invention, and the Step 25 corresponds to change means for changing the running mode in the present invention.

Figure 7:
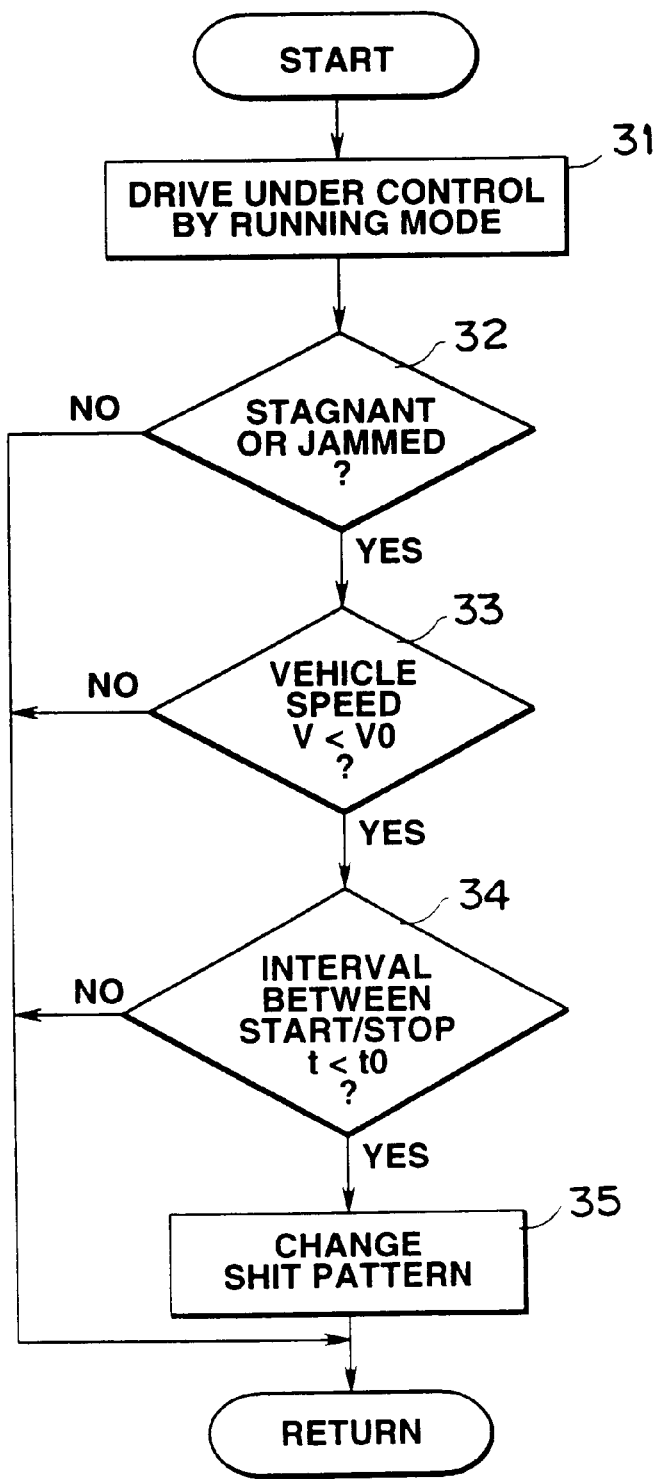
FIG. 7 is a flow chart showing another example of the control to be executed by the control system for an automatic transmission in accordance with the present invention.

FIG. 7 is a flow chart showing a fifth control example of the present invention, that is, a control example after the run of the vehicle has been started by the controls of FIGS. 2 to 5. First of all, the vehicle is driven (at Step 31) while controlling the automatic transmission 2 on the basis of the selected running mode. By the navigation system 11, on the other hand, it is decided (at Step 32) whether or not the roads of the followed route are stagnant or jammed. If the answer of Step 32 is "YES", it is decided (at Step 33) whether or not the present average vehicle speed V is less than a reference value V0.

If the answer of Step 33 is "YES", it is decided (at Step 34) whether or not the interval (i.e., time period) t between the start/stop of the vehicle, as detected by the navigation system 11 or the brake switch 8, is less than a reference interval (or time period) t0. If the answer of Step 34 is "YES", the present running mode is changed to the economy mode optimizing the mileage (at Step 35), and the routine is returned.

Incidentally, if the answer of Step 32 or 33 are "NO", the routine is returned. The aforementioned Steps 32 to 34 correspond to the running state detecting means of the present invention, and the Step 35 corresponds to change means for changing the running mode in the present invention. Thus, according to the control example of FIG. 6 or 7, the running mode, i.e., the shift pattern is changed on the basis of the actual running state of the vehicle, as detected on the followed route, so that the matching between the actual running state and the running mode is enhanced to improve the running performance and the drivability better.

In the control examples of FIGS. 2 and 3 and FIG. 4, on the other hand, the route to be followed to the destination is set/selected. Independently of the destination, however, the route to be followed could be set/selected on the basis of the running state such as the road situations just ahead, the coming road situations, the steering angle and the throttle opening.

Here will be presented such other specific examples of the control examples of FIGS. 6 and 7 as will change the running mode on the basis of the running state. If it is detected by the navigation system 11 that the vehicle will run on low surface friction roads such as snow-laden roads or frozen roads in winter, the running mode being employed may be changed to the snow mode, in which the vehicle is started from the second speed of the forward range, or in which speed changes are inhibited at curves. These controls could be suitably added to the aforementioned individual control examples.

Other control examples for changing the running mode during the run will be enumerated in the following. If it is detected by the navigation system 11 that the road is stagnant or jammed, the running mode is changed into that, in which the shifting frequency of the automatic transmission 2 is low, or in which the gear stage is fixed. Alternatively, if it is decided by the navigation system 11 that the route to be followed is an urban area, the running mode is changed to that in which the fuel injection is frequently cut by setting the RPM allowing the fuel injection cutting to a lower value so that the injection rate of the fuel to be fed to the engine 1 may be adjusted or cut by a fuel injection unit 31 thereby to improve the mileage.

In the present invention, moreover, if it is decided on the basis of the signals, as inputted from the shift position sensor 7, the brake switch 8, the accelerator position sensor 7 and the throttle sensor 30, that the drive of the driver is directed to the sporty drive, the running mode could be changed to that in which the speed change is executed at a higher vehicle speed and with a smaller throttle opening. On the other hand, if it is decided by the navigation system 11 that the vehicle will run under road situations having many flat roads, the running mode could be changed to that in which the lockup clutch is applied at a lower vehicle speed side to improve the mileage.

In the present invention, the control to change the running mode for matching the situations of a route to be followed is specifically exemplified by the control to move the shift point to a higher or lower vehicle speed side, the control to move the shift point to a smaller or larger throttle opening side, the control to execute a downshift or upshift forcibly, the control to inhibit a speed change, the control to inhibit an upshift to a specific or higher gear stage, the control to inhibit a downshift to a specific or lower gear stage, and the control to shift the application point or slip region of the lockup clutch to a higher or lower vehicle speed side.

On the other hand, other specific controls to change the running mode are exemplified by the control to shift the application point or slip region of the lockup clutch to a larger or smaller throttle opening side, the control to inhibit the application or slip control of the lockup clutch (or to keep the released state), the control to execute the application or slip control of the lockup clutch forcibly (or to keep the applied state), and the control to change the throttle opening for interchanging the individual running modes (including the normal mode, the power mode, the economy mode and the snow mode) to a higher or lower throttle opening side thereby to change the shift point or the application point or region of the lockup clutch.

Moreover, other specific controls to change the running mode are exemplified by the control to correct the RPM (including the engine RPM, the turbine runner RPM of the torque converter, and the RPM of the output shaft) to a lower or higher side to change the shift point or the application point or the slip region of the lockup clutch substantially, the control to move the coast-down shift point to a higher vehicle speed side, the control to move the upshift point to a higher vehicle speed side after a downshift, and the control to move the upshift point to a smaller throttle opening side after a downshift.

Moreover, the present invention could be applied to the well-known continuously variable automatic transmission, such as a belt type automatic transmission which is equipped with a pulley and a belt to adjust the output torque by changing the width of the V-shaped groove of the pulley, or a toroidal automatic transmission which is equipped with a power roller and input/output discs to adjust the output torque by changing the angle of the power roller.

When this continuously variable automatic transmission is used, the controls to change the various running modes can be exemplified by the control to change the reduction ratio to a relatively high side (or a lower vehicle speed side) or a relatively low side (or a higher vehicle speed side), the control to correct the detected value of the RPM (including the engine RPM and the output shaft RPM) to a lower or higher RPM value thereby to change the gear ratio on the basis of the corrected value, and the control to correct the detected value of the throttle opening to a higher or lower side thereby to change the gear ratio on the basis of the corrected value.

What is claimed is:

1. A control system for executing a control of the output torque of an automatic transmission on the basis of any of a plurality of transmission running modes having different running characteristics, comprising:

means for selecting one of the plurality of running modes to be used for a run to a destination;

means for selecting a route to be followed by the vehicle to the destination, with reference to the running characteristics of the selected one of said running modes.

2. A control system for an automatic transmission according to claim 1, further comprising:

first decision means for deciding whether or not the route to be followed, as selected by said route selecting means, has been approved by the driver; and first control means for controlling said automatic transmission, when the vehicle runs on the route to be followed, as approved, on the basis of the running mode which has provided the reference for selecting said route to be followed.

3. A control system for an automatic transmission according to claim 2, further comprising:

running state detecting means for detecting the running state of the vehicle while said vehicle is running with said automatic transmission being controlled by said first control means on the basis of said running mode; and change means for changing the running mode being selected for controlling said automatic transmission into another on the basis of the running state which is detected by said running state detecting means.

4. A control system for an automatic transmission according to claim 3, wherein said running state detecting means includes means for detecting at least any of a frequency of executing speed changes, a frequency in which a throttle opening exceeds a preset reference value, a frequency in which a changing speed of a throttle opening exceeds a preset reference value, a stagnant situation on said route to be followed and ahead of the vehicle, an average speed of the vehicle, and a time interval between the start/stop of the vehicle.

5. A control system for executing a control of the output torque of an automatic transmission on the basis of any of a plurality of transmission running modes, comprising:

running mode selecting means for selecting the running mode on the basis of a route to be followed, as selected as a followed route to a destination;

decision means for deciding whether or not the route and running mode to be followed, as selected by said running mode selecting means, has been approved by a driver; and control means for controlling said automatic transmission, when the vehicle runs on the route to be followed, as approved, on the basis of the running mode which has provided the reference for selecting said route to be followed.

6. A control system for an automatic transmission according to claim 5, further comprising:

running state detecting means for detecting the running state of the vehicle while said vehicle is running with said automatic transmission being controlled by said control means on the basis of said running mode; and change means for changing the running mode being selected for controlling said automatic transmission into another on the basis of the running state which is detected by said running state detecting means.

7. A control system for an automatic transmission according to claim 6, wherein said running state detecting means includes means for detecting at least any of a frequency of executing speed changes, a frequency in which a throttle opening exceeds a preset reference value, a frequency in which a changing speed of a throttle opening exceeds a preset reference value, a stagnant situation on said route to be followed and ahead of the vehicle, an average speed of the vehicle, and a time interval between the start/stop of the vehicle.

8. A control system for executing a control of the output torque of an automatic transmission on the basis of any of a plurality of transmission running modes, comprising:

destination setting means for setting a destination of the vehicle;

route selecting means for selecting the routes to be followed to the destination, as set by said destination setting means, for the individual running modes with reference to the running characteristics of said running modes;

decision means for deciding a route and running mode, as approved by a driver, of the routes to be followed selected by said route selecting means and the running modes corresponding to the selected routes to be followed; and control means for controlling said automatic transmission on the basis of the running mode, as decided by said decision means.

9. A control system for an automatic transmission according to claim 8, further comprising:

running state detecting means for detecting the running state of the vehicle while said vehicle is running with said automatic transmission being controlled by said control means on the basis of said running mode; and change means for changing the running mode being selected for controlling said automatic transmission into another on the basis of the running state which is detected by said running state detecting means.

10. A control system for an automatic transmission according to claim 9, wherein said running state detecting means includes means for detecting at least any of a frequency of executing a shift, a frequency in which a throttle opening exceeds a present reference value, a frequency in which a changing speed of a throttle opening exceeds a present reference value, a stagnant situation on the route to be followed and ahead of the vehicle, an average speed of the vehicle, and a time interval between a start/stop of the vehicle.

* * * * *